US007168933B2

(12) United States Patent
Stern

(10) Patent No.: US 7,168,933 B2
(45) Date of Patent: Jan. 30, 2007

(54) DEVICE FOR DISCHARGE OR OUTFEED OF A PASTY PRODUCT, PREFERABLY FOODSTUFF, FROM A CONTAINER

(75) Inventor: Leif E. Stern, Lomma (SE)

(73) Assignee: Asept International AB, Lund (SE)

( * ) Notice: Subject to any disclaimer, the term of this patent is extended or adjusted under 35 U.S.C. 154(b) by 417 days.

(21) Appl. No.: 10/758,051

(22) Filed: Jan. 14, 2004

(65) Prior Publication Data

US 2004/0173638 A1 Sep. 9, 2004

(30) Foreign Application Priority Data

Jan. 15, 2003 (SE) .................................... 0300063

(51) Int. Cl.
*G01F 11/06* (2006.01)

(52) U.S. Cl. ........................ 425/87; 425/449; 425/457; 425/458; 222/43; 222/287; 222/309; 222/327

(58) Field of Classification Search ................ 222/390, 222/326, 309, 327, 43, 287; 425/449, 457, 425/87, 458; 99/450.1, 450.2, 494
See application file for complete search history.

(56) References Cited

U.S. PATENT DOCUMENTS 4,090,639 A 5/1978 Campbell et al.
4,330,070 A * 5/1982 Doubleday ................... 222/43
4,518,105 A * 5/1985 Kuckens et al. ............ 222/207
5,137,181 A * 8/1992 Keller ........................ 222/134
5,156,305 A * 10/1992 Eyre .......................... 222/327
5,323,931 A * 6/1994 Robards et al. ............... 222/96
5,643,572 A * 7/1997 Byers et al. ............. 424/171.1
5,802,691 A * 9/1998 Zoltaszek .............. 29/243.526
5,873,499 A * 2/1999 Leschinsky et al. ........ 222/327

FOREIGN PATENT DOCUMENTS

WO WO-00/53512 9/2000

* cited by examiner

*Primary Examiner*—Joseph S. Del Sole
(74) *Attorney, Agent, or Firm*—Tarolli, Sundheim, Covell and Tummino LLP

(57) ABSTRACT

The present invention relates to a device for discharge or outfeed of a pasty product, preferably foodstuff, from a container. A piston means (11) is brought to perform a discharge movement in a discharge direction (F) for discharge or outfeed of the product (2) from the container (3). At least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation, after discharge. At least one stroke setting or stroke determining means (30) is provided for determining the stroke of the piston means (11) and thereby, the dose volume during each discharge or outfeed of product (2) from the container (3). The stroke setting means (30) for determining a stroke of the piston means (11) is replaceably provided on said piston means (11) such that it can be replaced by another stroke setting means (30) for determining or setting another stroke.

7 Claims, 2 Drawing Sheets

DEVICE FOR DISCHARGE OR OUTFEED OF A PASTY PRODUCT, PREFERABLY FOODSTUFF, FROM A CONTAINER

FIELD OF THE INVENTION

The present invention relates to a device for discharge or outfeed of a pasty product, preferably foodstuff, from a container, wherein the discharge of the product from the container is accomplished by imparting a triggering movement to a trigger, said triggering movement being transferred to a piston means such that said piston means is brought to perform a discharge movement in a discharge direction for discharge or outfeed of the product from the container.

BACKGROUND OF THE INVENTION

Discharge devices for discharge or outfeed of pasty foodstuff products from containers are known from the publications WO 00/53512 and U.S. Pat. No. 4,090,639. A discharge device however, is lacking, which permits non-drop discharge or ouffeed of product as wall as easy setting for portioning of different dose volumes.

SUMMARY OF THE INVENTION

The object of the present invention has therefore been to provide an adequate discharge device which eliminates this problem.

Since the device according to the invention comprises a retraction or withdrawal means for withdrawal of the piston means of the device, non-drop operation is accomplished. Since there is also a stroke setting or stroke determination means which can be replaced by another stroke setting means, the stroke of the piston means and thereby, the dose volume of the device can be varied.

BRIEF DESCRIPTION OF THE DRAWINGS

The invention will be further described below with reference to the accompanying drawings, in which.

DESCRIPTION OF THE PREFERRED EMBODIMENTS

Figure 1:
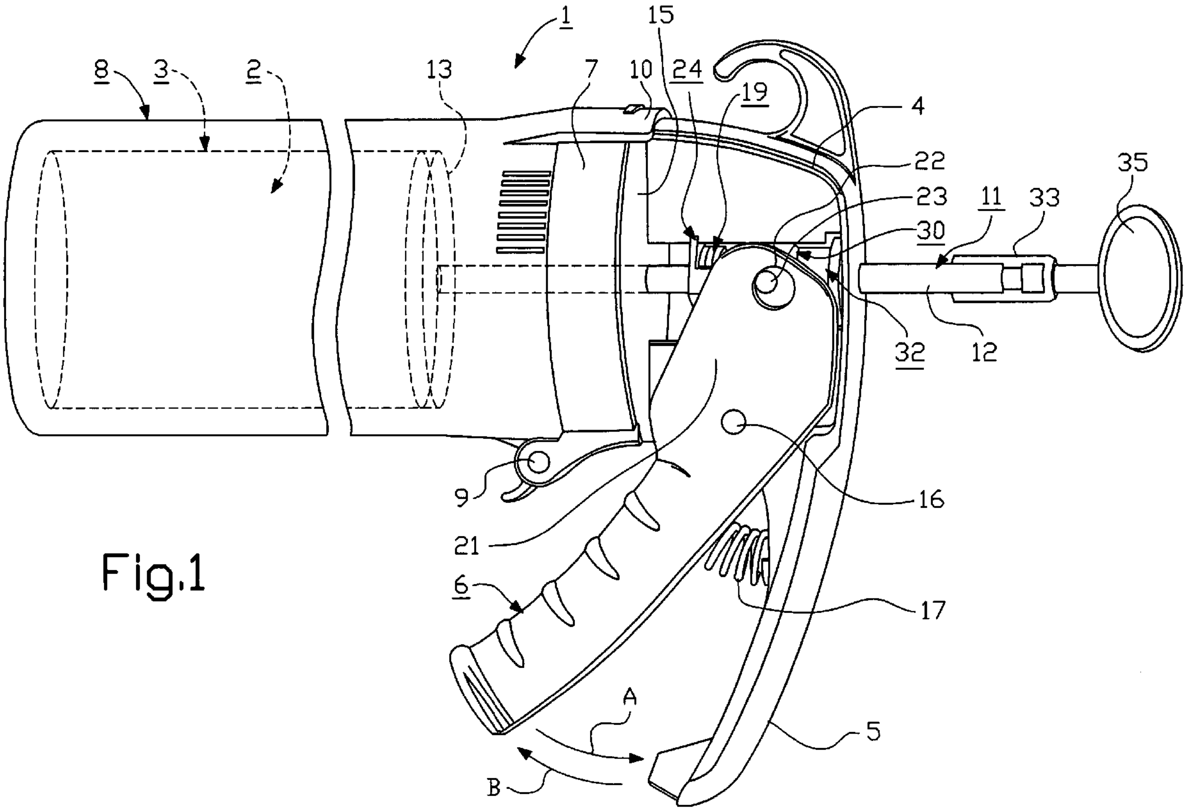
FIG. 1 is a perspective view of a discharge device having a device according to the invention.
Figure 2:
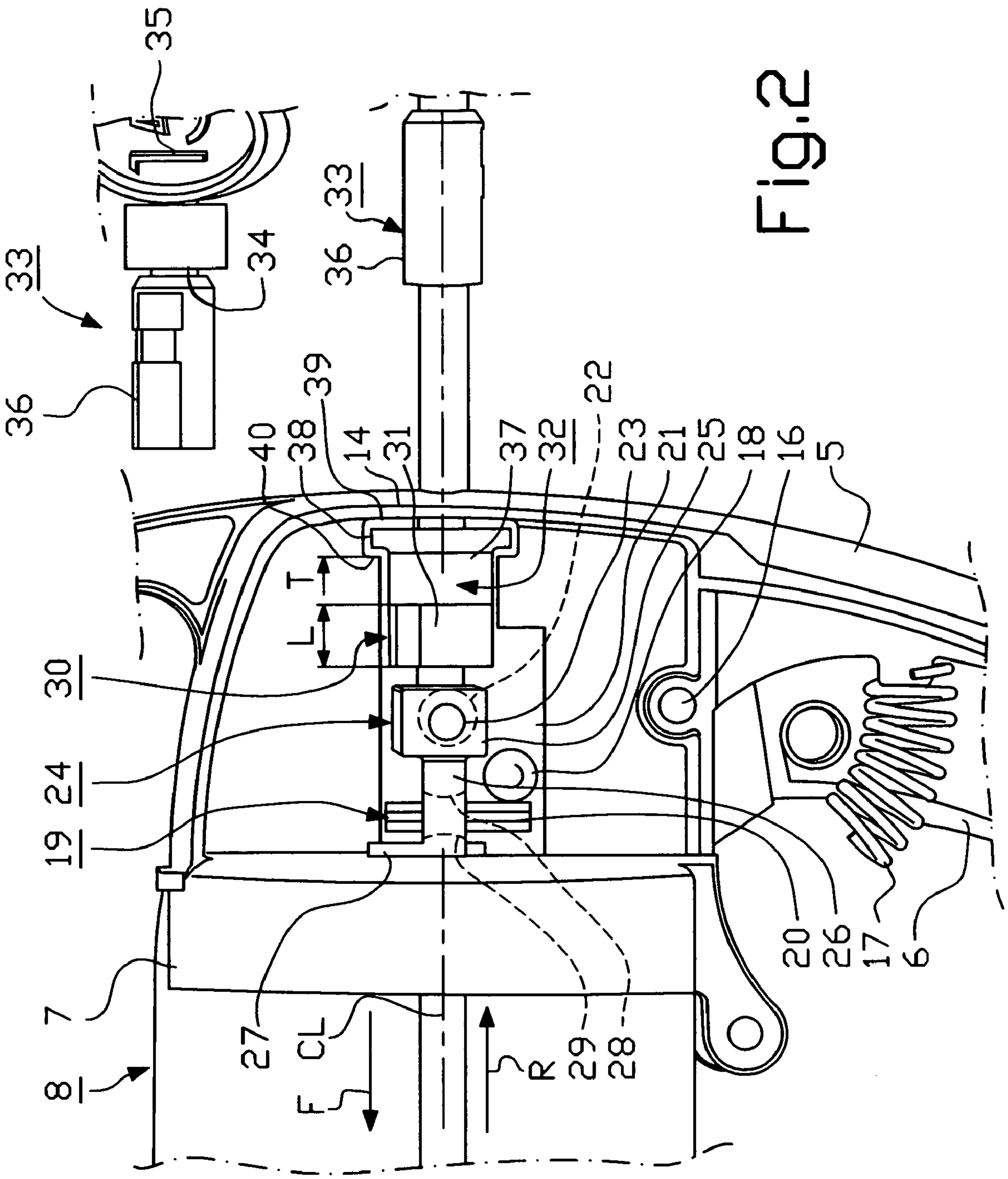
FIG. 2 is a side view of an enlarged part of the device of FIG. 1 with hiding details removed.

The discharge device 1 illustrated in the drawings has a gun or pistol like shape and is adapted for discharge or outfeed, in portions, of pasty products 2, preferably foodstuff such as mayonnaise, ketchup, mustard or similar, from a container 3.

The discharge device 1 has a body 4 defining a downwardly directed handle member 5 which one can hold in the hand together with a downwardly directed trigger 6 located in front of the handle member 5. At the front, the body 4 includes a cylindrical, in forward direction open member 7 on which a cylindrical magazine 8 is provided. This cylindrical magazine 8 is open at the rear and at the front and its diameter corresponds substantially with the diameter of the cylindrical member 7. The magazine 8 is through a link device 9 down below provided on the member 7 such that it extends coaxially therewith and can be let down for exposing the magazine 8 at the rear for location of the container 3 therein and removal of the container 3 therefrom. When the container 3 has been placed in the magazine 8, said magazine 8 can be moved upwards and returned to the original or start position in which it at the top is attached to the member 7 by means of a snap-in device 10.

A piston means 11 is provided at the body 4, said piston means comprising a piston rod 12 and a pressure plate 13 or similar. The piston rod 12 extends through and is displaceably mounted in a rear part 14 of the body 4 and it extends through and is displaceably mounted also in a rear wall 15 of the cylindrical member 7. The pressure plate 13 is provided on the piston rod 12 in front of the wall 15 and a discharge movement in a discharge direction F forward can be imparted thereto by the trigger 6 such that it compresses the container 3 located in the magazine 8 for opening said container at the front for discharge or outfeed, in portions, of the product 2. By means of the trigger 6, the piston rod 12 may also be brought to perform a retraction or withdrawal movement in a retraction direction R opposite to the discharge direction F.

The trigger 6 is pivotally mounted on the body 4 by means of an articulated axle 16 or similar, which is located transverse to the discharge and retraction directions F, R of the piston rod 12. By pivoting the trigger 6 about said articulated axle 16, said trigger 6 can be imparted or brought to perform a triggering movement in a triggering direction A towards the handle member 5. This triggering movement in the triggering direction A is limited by suitable means, e.g. by providing a stop lug (not shown) on the handle member 5. Between the trigger 6 and the handle member 5 there is provided a return means 17 in the form of a screw spring or similar. By imparting the triggering movement in the triggering direction A to the trigger 6, the return means 17 is stretched, and when one releases the tripper 6, one imparts to the return means 17 a return movement B to the start position.

The trigger 6 has a press shoulder 18 or similar between the articulated axle 16 and the piston rod 12, said press shoulder 18 being adapted to cooperate with a gripping appliance 19 such that said gripping appliance is brought to grasp the piston rod 12 for transferring the triggering movement of the trigger 6 to the piston rod 12 and thereby imparting its discharge movement thereto.

The gripping appliance 19 may include one or more washers 20 having holes for the piston rod 12 and threaded onto said piston rod 12 such that they hang straight down thereon. In these positions, the washers 20 do not grasp the piston rod 12 and the piston rod 12 can be displaced in relation thereto or vice versa. The holes have a larger diameter than the piston rod 12, which means that the washers 20 can be set obliquely by means of the press shoulder 18 such that they grasp or engage the piston rod 12 and transfer the triggering movement of the trigger 6 to the piston rod 12 and impart the discharge movement of said trigger 6 thereto.

The press shoulder 18 may e.g. be located between two upper parts 21 of the trigger 6, namely such upper parts which are found on opposite sides of the piston rod 12.

The upper parts 21 of the trigger 6 has holes 22 which are located beside the piston rod 12. The edges of the holes 22 define contact surfaces through which the trigger 6 can cooperate with contact surfaces on follower pins 23 which protrude into the holes 22 and which are located on a retraction or withdrawal means 24 for retraction or withdrawal of the piston means 11 after discharge. The holes 22 are provided relative to the follower pin 23 such that when the trigger 6 is brought to perform its return movement B by the return means 17, the contact surfaced defined by the edges of the holes 22 are brought in contact with the contact surfaces of the follower pin 23, whereby the trigger imparts a movement in the retraction direction R to the retraction means 24.

The retraction means 24 is provided on the piston rod 12 and has at the rear a sleeve-like member 25 with a hole for the piston rod 12. From the sleeve-like member 25, two arms 26 extend in forward direction. These arms 26 are at the front connected to each other by a front member 27 having a hole for the piston rod 12. The arms 26 of the retraction means 24 have rear contact surfaces 28 and front contact surfaces 29 between which the gripping appliance 19 is engaging. These contact surfaces 28, 29 are convexly arcuate relative to the gripping appliance 19 and they constitute substantially parts of a circular arc, the center of which lies on or close to a geometric centre line CL which is directed along the piston rod 12. Since the contact surfaces 28, 29 have such an arcuate shape, the washers 20 of the gripping appliance 19 can cooperate therewith e.g. when the retraction means 24 pulls said washers 20 backwards in the retraction direction R without tilting of the washers 20 relative to the piston rod 12 and without said washers 20 grasping or engaging said piston rod 12.

The retraction means 24 cooperates with the piston rod 12 with such friction that it follows the piston rod when said piston rod is moved forward in the discharge direction F by the trigger 6 by means of the gripping appliance 19, and it pulls the piston rod 12 backwards in the retraction direction R when it is affected in that direction by the return means 17 through the trigger 6.

Behind the retraction means 24 there is provided on the piston rod 12 at least one stroke determination or stroke setting means 30, which is adapted to determine how far the trigger 6 shall be able to retract or withdraw the piston rod 12 in the retraction direction R and thereby, how far the trigger 6 during the subsequent discharge or outfeed shall be able to move the piston rod 12 in the discharge direction F, i.e. the extent of the stroke of the piston means 11 during the next discharge and thereby, how large the dose volume will be during the next discharge or outfeed of the product 2. This stroke setting means 30 may have a length L and may be replaced by a stroke setting means 30 having another length for altering the stroke of the piston means 11.

The stroke setting means 30 is preferably a sleeve 31 having a longitudinal slot and consisting of elastic material such that it can be attached by a snap-in action to the piston rod 12 by threading onto said piston rod 12, and released from the piston rod 12 by being pulled off from the piston rod 12 in the opposite direction. The sleeve 31 cooperates with the piston rod 12 with such friction that it is brought along therewith when the piston rod 12 is moved forward in the discharge direction F and backwards in the retraction direction R.

The stroke setting of the piston means 11 is carried through while the retraction means 24 abuts the stroke setting means 30 during its movement in the retraction direction R together with the piston means 11 and when the stroke setting means 30 is situated in a rear position. At the illustrative example of the construction, the rear position of the stroke setting means 30 is determined by a retraction stop means 32 when this in turn is situated in a rear position.

The stroke of the piston means 11 will be dependent on the length L of the stroke setting means 30, i.e. in this case the length L of the sleeve 31, and this stroke can be easily changed by replacing the sleeve 31 by a sleeve 31 having another length L.

There may be a number of sleeves 31 of different lengths L in readiness for each discharge device 1 such that one and the same discharge device 1 can be imparted to or brought to perform different strokes and thereby, when required, be brought to discharge or outfeed different dose volumes when product 2 is discharged.

For every sleeve 31 there may be a bracket 33 with a member 34 onto which the sleeve 31 can be attached by a snap-in action. The bracket 33 and an associated sleeve 31 may have the same or similar colours or other markings and the bracket 33 may have numerical information 35 or other information about which dose volume the associated sleeve 31 can handle when used in the discharge device 1. The bracket 33 may also have a sleeve-like member 36 allowing threading of the bracket 33 onto the piston rod 12. The object therewith is that the bracket 33, the sleeve 31 of which is used for determining the dose volume, can be attached to the piston rod 12 in order to clearly indicate which dose volume the discharge device 1 momentarily can provide or discharge.

The retraction stop means 32 may have the shape of a sleeve 37 which at the rear has a radially outwardly directed collar 38. The sleeve 37 is threaded onto the piston rod 12 and cooperates therewith with such friction that it is brought along with the piston rod 12 during the forward movement thereof in the discharge direction F and thereby, also backwards in the retraction direction R. The sleeve 37 is provided between the sleeve 31 and the rear part 14 of the body 4 defining a rear contact surface 39 for the sleeve 37. The body 4 also defines a front contact surface 40 with which the collar 38 can cooperate. The distance T between the rear and front contact surfaces 39, 40 corresponds with the distance the sleeve 37 can move relative to the body 4. The distance A is chosen such that when the sleeve 37 is brought along by the piston means 11 from a rear position in which it engages the rear contact surface, forward in the discharge direction F and stopped by the front contact surface 40, the piston means 11 has been imparted to an idle movement after discharge of product 2 and is reset to perform a new discharge or outfeed. During this idle movement, no discharge of product 2 occurs. When the piston means 11 thereafter continues to be imparted to the discharge movement in the discharge direction F, the piston rod 12 will slide in the sleeve 37 and discharge of product 2 will occur from the container 3.

The discharge device 1 described above operates as follows.

By pressing in the trigger 6 in the triggering direction A, the press shoulder 18 will engage the gripping appliance 19 which will change position such that it grasps the piston rod 12 so that the trigger 6 by continued triggering imparts to the piston means 11 its discharge movement in the discharge direction F. Thereby, the piston rod 12 will bring along the retraction stop means 32, the stroke setting means 30 and the retraction means 24 in the discharge direction F. When the movement of the retraction stop means 32 in the discharge direction F has stopped, the piston means 11 has been reset for a new discharge or outfeed of product 2 from the container 3, which will occur by imparting to the piston means 11 a continued discharge movement in the discharge direction F.

When discharge or outfeed of product 2 from the container 3 has occurred, the trigger 6 is released and will be pressed back by the return means 17 in the return direction B which is opposite to the triggering direction A. Thereby, the gripping appliance 19 will disengage the piston rod 12 and the edges of the holes 22 in the upper parts 21 of the trigger 6 will strike the follower pins 23 of the retraction means 24, whereby the trigger 6 will move or drive the retraction means 24 in the retraction direction R. The retraction means 24 will in turn move or bring along the piston means 11 in the retraction direction R and when the retraction stop means 32 is stopped by the rear contact surface 39 on the body 4, this will stop the stroke setting means 30. By continued retraction movement of the piston rod 12, said piston rod 12 will slide in the stroke setting means 30, and the retraction stop means 32 and the retraction means 24 will finally be stopped by the stroke setting means 30, whereby the retraction movement of the piston means 11 will also be stopped.

During next discharge, the process described above will be repeated and this continues until the container is empty and can be replaced by a full container.

The invention is not limited to the embodiment described above, but may vary within the scope of the subsequent claims. Instead of that the retraction means 24 cooperates with the trigger 6 such that when the trigger is brought to perform its return movement by the return means 17, the piston means 11 is brought to perform its retraction movement, the retraction means 24 may cooperate with a return means which is positioned at another location between said retraction means and the body. The container 3 may consist of flexible synthetic material and be compressible by the piston means 11 for discharge of product 2 therefrom. Those parts of the container 3 having one or more discharge holes for product 2, may expand such that the discharge hole is opened and let the product out from the container 3, and said parts thereof may thereafter contract for closing the discharge hole after the discharge or outfeed. The container 3 may be a plastic bag, but may alternatively be designed in a completely different manner. The retraction means 24 and/or the stroke setting means 30 and/or the retraction stop means 32 may be designed otherwise than described, but still have the same or similar functions as described. Naturally, the bracket 33 may also be of another type than described and it may be attached to the piston means 11 otherwise than described. The bracket 33 may of course alternatively be mounted on the body 4 instead of on the piston means 11.

The invention claimed is:

1. Device for discharge or outfeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or outfeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke setting or stroke determining means (30) is provided for determining the stroke of the piston means (11) and thereby, the dose volume during each discharge or outfeed of product (2) from the container (3), that a stroke setting means (30) for determining a stroke of the piston means (11)is replaceably provided on said piston means (11) such that it can be replaced by another stroke setting means (30) for determining or setting another stroke, that the retraction means (24) comprises a sleeve-like member (25) which is threaded onto a piston rod (12) of the piston means (11), that the retraction means (24) further includes two arms (26) which extend in a forward direction from the sleeve-like member (25) and are located on opposite sides of the piston rod (12), and that the arms (26) at the front are connected with each other through a front member (27) which is threaded onto the piston rod (12).

2. Device for discharge or outfeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or ouffeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke selling or stroke determining means (30) is provided for determining the stroke of the piston means (11) and thereby, the dose volume during each discharge or outfeed of product (2) from the container (3), that a stroke setting means (30) for determining a stroke of the piston means (11) is replaceably provided on said piston means (11) such that it can be replaced by another stroke setting means (30) for determining or setting another stroke, and that the stroke selling means (30) is a slotted sleeve (31) which can be threaded onto a piston rod (12) of the piston means (11) from a lateral direction and which is provided such that the length (L) thereof determines the stroke of the piston means (11).

3. Device for discharge or ouffeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or ouffeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke setting or stroke determining means (30) is provided for determining the stroke of the piston means (11) and thereby, the dose volume during each discharge or outfeed of product (2) from the container (3), that a stroke setting means (30) for determining a stroke of the piston means (11) is replaceably provided on said piston means (11) such that it can be replaced by another stroke setting means (30) for determining or setting another stroke, that the stroke setting means (30) and the retraction means (24) are provided on the piston means (11) such that the stroke setting means (30), in the discharge direction (F), is located behind the retraction means (24), and that the stroke setting means (30) is provided to limit the stroke of the piston means (11) by limiting the retraction movement thereof in the retraction direction (R) by indirect or direct cooperation with a body (4) of the discharge device (1) and by the stroke setting means (30) determining the length of the movement of the retraction means (24) in the retraction direction (R).

4. Device for discharge or outfeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or outfeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke setting or stroke determining means (30) is provided for determining the stroke of the piston means (11) and thereby, the dose volume during each discharge or outfeed of product (2) from the container (3), that a stroke setting means (30) for determining a stroke of the piston means (11) is replaceably provided on said piston means (11) such that it can be replaced by another stroke setting means (30) for determining or setting another stroke, that at least one retraction stop means (32) is provided on the piston means (11) behind the stroke selling means (30), seen in the discharge direction (F), that the retraction stop means (32) cooperates with the piston means (11) with such friction that it is brought along therewith in the discharge and retraction directions (F, R) and is movable between a rear and a front contact surface (39, 40), that the distance (T) between the rear and front contact surfaces (39, 40) corresponds or substantially corresponds with an idle movement of the piston means (11) in the discharge direction (F), at which idle movement the piston means (11) is reset after a preceding discharge movement for subsequent discharge of product (2) from the container (3), and that the retraction stop means (32), when engaging the rear contact surface (39), stops the retraction movement of the stroke setting means (30), the retraction means (24) and the piston means (11) in the retraction direction (R).

5. Device according to claim 4, characterized in that the retraction stop means (32) has the shape of a sleeve (37) which is threaded onto a piston rod (12) of the piston means (11) and which with friction cooperates therewith, and that the rear and front contact surfaces (39, 40) are defined by a body (4) of the discharge device (1).

6. Device for discharge or ouffeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or outfeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke setting or stroke determining means (30) is provided for determining the stroke of the piston means (11) and thereby, the dose volume during each discharge or ouffeed of product (2) from the container (3), that a stroke setting means (30) for determining a stroke of the piston means (11) is replaceably provided on said piston means (11) such that it can be replaced by another stroke setting means (30) for determining or setting another stroke, that a gripping appliance (19) is provided to be affected by the trigger (6) such that it is brought to grasp the piston means (11) for transfer of the triggering movement (A) of the trigger (6) to the piston means (11) for imparting thereto a discharge movement in the discharge direction (F), that the gripping appliance (19) and the retraction means (24) cooperate with each other such that the retraction means (24) can pull the gripping appliance (19) in the retraction direction (R) relative to the piston means (11), that the retraction means (24) has contact surfaces (28, 29) between which the gripping appliance (19) is provided and through which the retraction means (24) can cooperate with the gripping appliance (19), said contact surfaces (28, 29) having convex arcuate shape relative to the gripping appliance (19), and that the arcuate shape of the contact surfaces (28, 29) constitute parts of a circular arc, the centre of which lies on or close to a geometric centre line (CL) which extends along a piston rod (12) of the piston means (11).

7. Device for discharge or outfeed of a pasty product, preferably foodstuff, from a container, wherein the discharge of the product (2) from the container (3) is accomplished by imparting a triggering movement to a trigger (6), said triggering movement being transferred to a piston means (11) such that said piston means (11) is brought to perform a discharge movement in a discharge direction (F) for discharge or outfeed of the product (2) from the container (3), characterized in that at least one retraction or withdrawal means (24) is provided for imparting to the piston means (11) a retraction movement in a retraction direction (R) opposite to the discharge direction (F), such that the pressure from the piston means (11) against the container (3) is relieved for accomplishing non-drop operation after discharge, that at least one stroke setting or stroke determining means (30) is provided for determining the stroke of the piston means (11) and thereby, the dose volume during each discharge or outfeed of product (2) from the container (3), that a stroke setting means (30) for determining a stroke of the piston means (11) is replaceably provided on said piston means (11) such that it can be replaced by another stroke setting means (30) for determining or setting another stroke, that a gripping appliance (19) is provided to be affected by the trigger (6) such that it is brought to grasp the piston means (11) for transfer of the triggering movement (A) of the trigger (6) to the piston means (11) for imparting thereto a discharge movement in the discharge direction (F), that the gripping appliance (19) and the retraction means (24) cooperate with each other such that the retraction means (24) can pull the gripping appliance (19) in the retraction direction (R) relative to the piston means (11), and that the gripping appliance (19) has one or more washers (20) which are threaded onto a piston rod (12) of the piston means (11) and which by the trigger (6) can be set obliquely such that they are brought to engage the piston rod (12) and transfer the triggering movement of the trigger (6) to the piston rod (12) such that said piston rod (12) is brought to perform its discharge movement.

* * * * *